United States Patent [19]

Persson

[11] Patent Number: 5,445,875
[45] Date of Patent: Aug. 29, 1995

[54] LAMINATE COMPRISING A CORROSIVE-RESISTANT PLASTIC FILM, A LAYER OF CUT FIBERS, A LAYER OF CONTINUOUS FIBERS AND A REINFORCEMENT LAYER, THE FIBROUS LAYER BEING IMPREGNATED WITH A CURABLE RESIN

[75] Inventor: Börje Persson, Vilhelmina, Sweden

[73] Assignee: Inpipe Sweden AB, Vilhelmina, Sweden

[21] Appl. No.: 104,156

[22] PCT Filed: Feb. 20, 1992

[86] PCT No.: PCT/SE92/00102
§ 371 Date: Sep. 16, 1993
§ 102(e) Date: Sep. 16, 1993

[87] PCT Pub. No.: WO92/14606
PCT Pub. Date: Sep. 3, 1992

[30] Foreign Application Priority Data

Feb. 22, 1991 [SE] Sweden ................................. 9100525

[51] Int. Cl.6 .................. B32B 17/02; B32B 5/06; D04H 1/16
[52] U.S. Cl. ................. 428/228; 428/36.1; 428/36.2; 428/238; 428/251; 428/282; 428/285; 428/302
[58] Field of Search ............ 428/36.1, 36.2, 36.4, 428/36.5, 36.9, 36.91, 286, 282, 246, 251, 228, 238, 285, 302

[56] References Cited

U.S. PATENT DOCUMENTS

| | | |
|---|---|---|
| 4,670,315 | 6/1987 | Hillemeier et al. |
| 4,678,699 | 7/1987 | Kritchevsky et al. ............ 428/175 |
| 4,723,579 | 2/1988 | Hyodo et al. |
| 4,892,774 | 1/1990 | Vallance ............................ 428/36.1 |
| 4,927,684 | 5/1990 | Asensio et al. ..................... 428/245 |

FOREIGN PATENT DOCUMENTS 0392026 9/1988 European Pat. Off.

Primary Examiner—James D. Withers
Attorney, Agent, or Firm—Birch, Stewart, Kolasch & Birch

[57] ABSTRACT

A laminate for lining a passage, which is entirely or partially surrounded by walls, above or under the ground, which laminate comprises at least one layer of a reinforcement (4) of continuous fibre, a curable resin (5) and a plastic sheet or plastic film (3) which is on the inside of the laminate when the laminate is inserted into the passage (10) which shall be lined. In order to give the laminates corrosion durability and flexibility which stand on a par with the strength of the laminate so that not anyone of these parameters will determine the life length of the lining, there is arranged a mat (8) of fibres between the inner film (3) and the reinforcement (4) which mat on its side which is turned to the inner film (3) has cut fibres (13), and which together with its cut fibres can absorb resin for concentration of curable resin to the inner surface of the cured laminate.

12 Claims, 3 Drawing Sheets

LAMINATE COMPRISING A CORROSIVE-RESISTANT PLASTIC FILM, A LAYER OF CUT FIBERS, A LAYER OF CONTINUOUS FIBERS AND A REINFORCEMENT LAYER, THE FIBROUS LAYER BEING IMPREGNATED WITH A CURABLE RESIN

FIELD OF THE INVENTION

This invention relates to a laminate of that type being utilized for lining passages which are entirely or partially surrounded by walls, above or under the ground, for instance pipelines for a water system and a sewerage for instance, channels of different kinds, for instance for ventilation in buildings, and/or for manufacturing such passages, channels and pipes in a factory or in a place out in the field and which laminate comprises a curable resin positioned between two plastic foils or plastic films and at least one reinforcement layer of continuous fibre wires.

DESCRIPTION OF CONVENTION ART

Such laminates for lining of pipelines excavated down into the ground are previously known and normally have the design of a flexible lining hose which is either drawn into the pipeline and is then expanding against the inside of the pipeline by means of a pressure medium or is everted into the pipeline by means of a pressure medium, whereafter the entirely everted lining hose is kept expanded against the inside of the pipeline of the utilized pressure medium in order to make the lining hose or the lining laminate to be adapted to the mentioned inside. This pressure is maintained at least until the resin has been cured to such extent that the lining laminate has become entirely formstable.

The utilized pressure medium normally is air and/or water and in a heated condition this pressure medium is also utilized for carrying out or accelerating the initiating of the cure of the resin and with the plastic material type or resin type, used most times for this purpose, the cure generally continues in a natural way until the curing process has been completed.

Due to the fact that this type of cure, i.e. heat cure, requires a plentiful equipment and is expensive as a result of the necessary heating of utilized medium and takes a long time to carry out, radiation energy in the form of light has lately begun to be used for curing of the curable resin, being a part of the lining laminate, which resin is prepared in a way intended for that with suitable curing systems, catalysts, accelerators and so on for achieving a through-cure which is made as rapid as possible.

Independently of curing ways, however, the lining laminate after the cure, i.e. when the lining is finished, has to satisfy certain strength requirements and have a resistance to corrosion in order to be able to manage the environments are decades that it is intended for without being destroyed in one or another respect. This is true especially for such laminates which are intended for lining sewer pipes. Such linings have to be resistant to corrosion and also to have a necessary strength and particularly compression strength and stability in order to be able to resist the compression strains and loads which they are constantly exposed to from above, for instance from traffic.

To be able to unite strength to inner and outer loads, especially compression strength, as well as resistance to corrosion in one and the same lining laminate has caused to great problems. Up to now the lining laminates in the market have either better strength than resistance to corrosion or on the contrary, i.e. a better resistance to corrosion than strength, especially compression strength. Furthermore, known lining laminates have that drawback that they are often inflexible regarding the variations of the dimensions of the lining object.

SUMMARY OF THE INVENTION

The purpose of this invention is therefore to solve that problem and accordingly bring about a lining laminate having a good strength as well as corresponding resistance to corrosion and flexibility. This purpose has been achieved by the fact that lining laminate according to this invention has the characterizing features defined in the following claims.

BRIEF DESCRIPTION OF DRAWINGS

In the following the invention is described more closely with reference to accompanying drawings, in which.

DESCRIPTION OF PREFERRED EMBODIMENT

Figure 1:
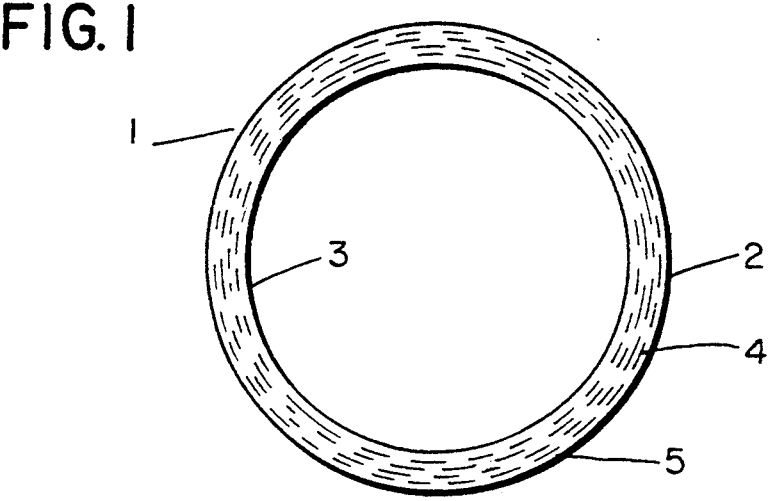
FIG. 1 shows a section through a known, hose-shaped lining laminate on which this invention is based.
Figure 2:
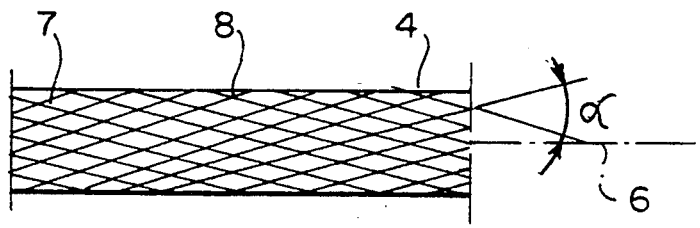
FIGS. 2 and 3 show from the side a section of a hose-shaped, plaited reinforcement in retracted and expanded, condition, respectively.
Figure 3:
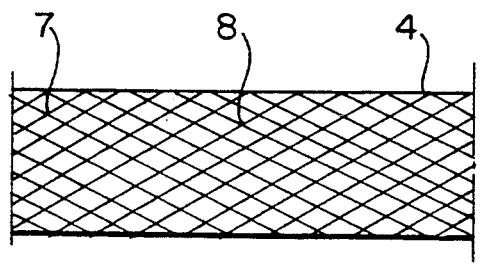

In FIG. 1 is shown a known hose-shaped laminate 1 for lining passages, which are surrounded by walls, for instance water pipes and sewer pipes, channels on as well as under the ground, and this laminate comprises an outer plastic foil or a plastic film 2 and an inner plastic foil or a plastic film 3 and a reinforcement layer 4 of continuous glass-fibres, positioned between these two foils 2, 3, and curable resin 5 between the mentioned foils 2, 3 and entirely or partially absorbed by the reinforcement layer 4. The reinforcement 4 comprises a hose-shaped stocking of continuous fibres extending cross-wise and preferably the mentioned reinforcement comprises continuous fibres 7, 8, plaited to a stocking, a hose or the like, and crossing each other and extending under essentially the same angle to the longitudinal axis 6 of the hose-shaped reinforcement, the fibres resting loosely against each other in their crossing points, whereby a change of the angle $\alpha$ between the fibres 7, 8 is allowed until the resin absorbed by the reinforcement begins to cure and by that lock the fibres mutually. Suitably the angle between the fibres, crossing each other, which seen in projection to the mentioned longitudinal axis 6 has this axis as a bisector, is arranged to increase when an internal pressure inside the hose-shaped laminate is established, and due to that fact also the diameter of the reinforcement is increased. Thus, with an increased diameter the reinforcement fibrers 7, 8 rise and when accordingly the reinforcement stocking 4 has been given its largest diameter, its fibres 7, 8 are in their most erected position and give in this position the reinforcement its greatest or best compression strength.

Figure 4:
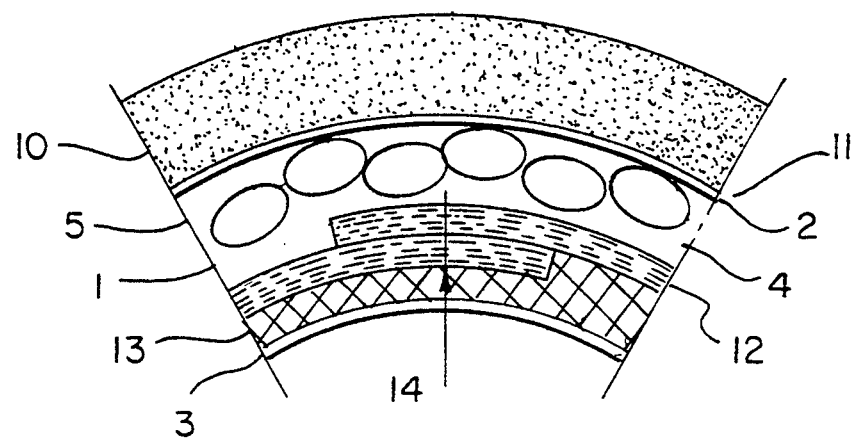
FIG. 4 shows a section of a first embodiment of the laminate according to this invention in place inside a pipe that shall be lined; and each of FIGS. 5–7 show a modified embodiment of the present laminate.

In FIG. 4 is shown a section of a first embodiment of a lining laminate 1 according to this invention introduced place inside a passage 10, surrounded by walls, for instance a pipeline that shall be lined and be kept in a pressure contact against its wall 11. Besides at least one and preferably several reinforcement layers 4 of the kind mentioned above and an inner film 3 which only functions as protection until the resin 5 in the laminate has been forced to cure and which thereafter can be removed, the embodiment shown in FIG. 4 of the lining laminate according to the invention comprises a mat 12 which is woven or laid of continuous glass fibres and which on its side turned to the inner film 3 has cut fibres 13 and preferably cut glass fibres. The material of the plaited reinforcement 4 comprises roving and the roving can be of KOSMOS ®, conventional or bulked type. The glass fibre in the combinated fabric, i.e. the mat 8 together with the added, cut glass fibre 3 can comprise E-glass, ECR-glass, C-glass or other high quality fibre materials.

Even if that is not shown in the drawings, the mat 12 woven or laid of continuous glass fibres may also on its other side be provided with a layer Of cut glass fibres.

The mat 12 with cut glass fibres 13 on at least its side turned to the inner film 3, which is also called hereinafter "the combination fabric", has among other things that quality that it absorbes resin to an essentially greater extent than the reinforcement 4 and due to that fact the resin 5 in the laminate 1 will in the first hand be absorbed by the combination fabric 12, 13 until saturation is achieved and thanks to that fact a concentration of resin is achieved to the inner surface portion or the surface layer of the laminate. Thus, when the resin has been forced to cure, an internal surface layer is achieved comprising a very high content of resin with cut glass fibres as a reinforcement which layer is resistant to corrosion. At the same time the cured resin intimately connects the combination fabric 12, 13 with the adjacent reinforcement layer 4 and the reinforcement layers 4 to each other to a lining having a very high strength, particularly compression strength to inner and outer loads and this lining is adaptable to the conditions where it shall be used by the fact that the number of reinforcement layers can be chosen with regard to the need from one up to 6–8.

Regarding the hose-shaped laminate 1 each utilized mat is made hose-shaped by laying its longitudinal edges so that these ones overlap each other and the edges are fastened to each other by wires or the like as is shown at 14 in FIG. 4.

Figure 5:
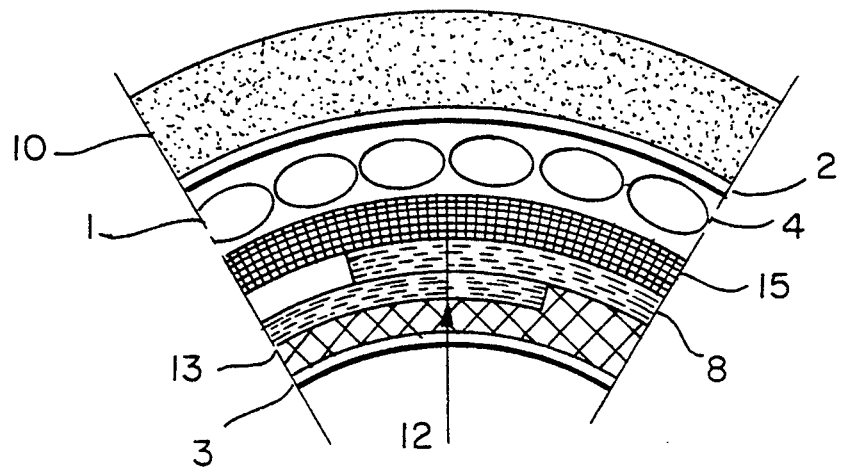

In the embodiment shown in FIG. 5 there is arranged a layer 15 of a core material between the reinforcement layers 4 and the combination fabric 12, 13 which layer 15 first of all shall be used for increasing the thickness without neglecting the strength and also for giving a distance between the combination fabric 12, 13 and the adjacent reinforcement layer 4. Instead of, and besides, of being positioned between the combination fabric 12, 13 and adjacent reinforcement layer 4, the layer 15 of core material can be used between the reinforcement layers 4. When using core material, a sandwich-laminate is received, the material utilization of which is optimum from a strength point of view. As a core material can be utilized FIRET ® or CHOMARET ®, that is a viscose polyester foam, alternatively cut glass fibres.

Figure 6:
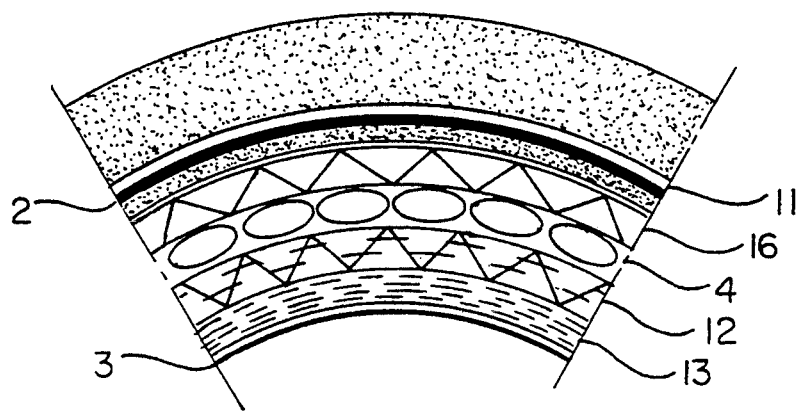

In FIG. 6 is shown an embodiment with a layer of felt 16 between the reinforcement 4 and the outer foil 2, which felt layer 16 functions to insulate against the cold wall 11 that shall be lined.

Figure 7:
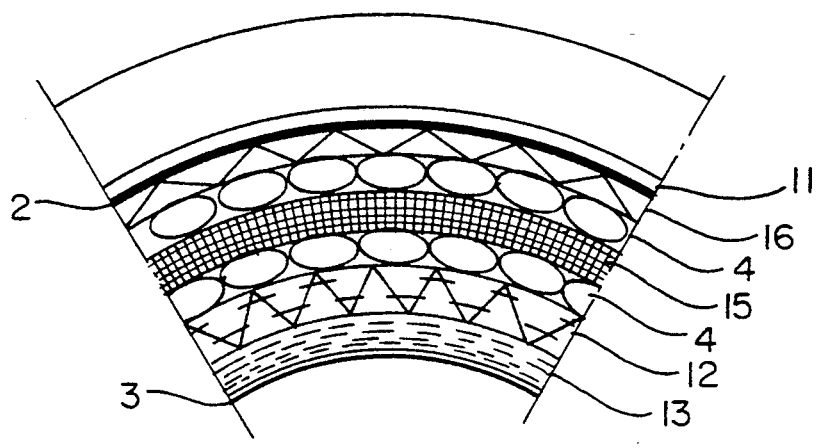

FIG. 7 shows an embodiment with a layer 15 of core material midway between the four reinforcement layers 4, and a felt layer 16 as an insulation against the lining wall 11 and the outer layer. The outer film 4 can be excluded in those case when the laminate is everted.

The choice of the quality of the glass fibre is made in accordance with the local requirements that are made on the lining regarding the resistance to chemicals and corrosion.

Thus, this laminate allows integration of the core material 16 for distancing to the plaited reinforcement layers 4 from each other and/or from the integrated combination fabric 12, 13 which in its turn as an alternative can be provided with a layer of core material. When using core material that possibility is achieved that a sandwich-laminate can be built to a low cost and to a low weight and this laminate has a very good strength. Besides a very good strength the laminate according to the invention gives a resistance to corrosion, the cut fibre 13 also functioning as a surface reinforcement and covering of the continuous fibre fabric 12 positioned inside the surface reinforcement. The fabric and above all the plaited reinforcement layers 4 contribute to the improvement of the strength and also function as resin holder during the storage and transportation phases from the factory to the utilization place.

This lining laminate also has that ability to be able to flexibly follow the geometry of the repaired passage, which has appeared to be an essential quality.

This invention is not limited to what has been described above and shown in the drawings but can be changed and modified in many different ways within the scope of the invention idea defined in the following claims. Regarding the resin many different types of resin can be used but preferably of unsaturated polyester type.

What is claimed is:

1. A laminate for lining passages entirely or partially surrounded by walls on or under the ground which comprises:
   an inner film comprising plastic foil or plastic film;
   a combination fabric layer formed on the outer surface of said inner film, said combination fabric comprising an inner layer of cut fibers adjacent to said inner film and an outer mat layer of fibers, wherein said combination fabric layer absorbs curable resin introduced therein; and
   at least a reinforcement layer comprising continuous fibers and curable resin, whereby an inner surface of said laminate is resistant to corrosion.

2. A laminate according to claim 1, wherein the outer mat layer comprises woven or laid continuous fibers.

3. A laminate according to claim 2, wherein the outer mat layer comprises woven or laid continuous glass fibers.

4. A laminate according to claim 2, wherein the inner layer of cut fibers comprises glass fibers.

5. A laminate according to claim 1, wherein the inner layer of cut fibers comprises glass fibers.

6. A laminate according to claim 5, further comprising a core material layer formed between the outer mat layer and the reinforcement layer.

7. A laminate according to claim 1, further comprising a core material layer formed between the outer mat layer and the reinforcement layer.

8. A laminate according to claim 7, further comprising at least two adjacent reinforcement layers and a core material layer formed between said two adjacent reinforcement layers.

9. A laminate according to claim 1, further comprising at least two adjacent reinforcement layers, and a core material layer formed between said two adjacent reinforcement layers.

10. A laminate according to claim 9, further comprising a felt mat insulation layer formed on an outer surface of the outermost reinforcement layer.

11. A laminate according to claim 1, further comprising a felt mat insulation layer formed on an outer surface of the reinforcement layer.

12. A laminate according to claim 1, further comprising an outer film which comprises a plastic foil or a plastic film formed on an outer surface of said reinforcement layer.

* * * * *